US011626686B2

(12) United States Patent
Telesco et al.

(10) Patent No.: US 11,626,686 B2
(45) Date of Patent: Apr. 11, 2023

(54) TABLET DOCKING STATION

(71) Applicant: Havis, Inc., Warminster, PA (US)

(72) Inventors: Stephen Telesco, Dexter, MI (US); Mo Walton, Livonia, MI (US)

(73) Assignee: Havis, Inc., Warminster, PA (US)

( * ) Notice: Subject to any disclaimer, the term of this patent is extended or adjusted under 35 U.S.C. 154(b) by 75 days.

(21) Appl. No.: 17/346,861

(22) Filed: Jun. 14, 2021

(65) Prior Publication Data
US 2022/0399672 A1    Dec. 15, 2022

(51) Int. Cl.
| | | |
|---|---|---|
| *H01R 13/627* | (2006.01) | |
| *H01R 13/508* | (2006.01) | |
| *B60R 16/02* | (2006.01) | |
| *H01R 13/187* | (2006.01) | |

(52) U.S. Cl.
CPC ........... *H01R 13/508* (2013.01); *B60R 16/02* (2013.01); *H01R 13/187* (2013.01); *H01R 13/6272* (2013.01); *H01R 2201/26* (2013.01)

(58) Field of Classification Search
CPC .............. H01R 13/508; H01R 13/187; H01R 13/6272; H01R 13/6271; H01R 13/6275; H01R 13/629; H01R 2201/26; G06F 1/1632; G06F 1/1656; G06F 1/181; H02J 7/0044; H02J 7/0045; B60R 16/02
See application file for complete search history.

(56) References Cited

U.S. PATENT DOCUMENTS

| | | | | |
|---|---|---|---|---|
| 4,588,938 A | * | 5/1986 | Liautaud ............... | H02J 7/0045 439/700 |
| 5,030,802 A | * | 7/1991 | Noro ...................... | B60Q 1/425 200/61.35 |
| 5,052,943 A | * | 10/1991 | Davis .................... | H02J 7/0042 439/298 |
| 5,256,953 A | * | 10/1993 | Cimbal .................. | H01R 13/74 320/114 |
| 5,535,274 A | | 7/1996 | Braitberg et al. | |

(Continued)

FOREIGN PATENT DOCUMENTS

KR    200265673 Y1    2/2002

OTHER PUBLICATIONS

Extended European Search Report for European Application No. 22175008.6, dated Nov. 18, 2022, 10 pages.

*Primary Examiner* — Thanh Tam T Le
(74) *Attorney, Agent, or Firm* — RatnerPrestia

(57) ABSTRACT

An apparatus for mounting an object having one or more electrical contacts within a vehicle, the object. The apparatus comprises a base configured to receive the object, the base comprising a mounting surface and a docking surface. A docking connector is coupled to the docking surface and is configured to electrically connect with the one or more electrical contacts of the object. The docking connector is movable relative to the docking surface between a first position and a second position. When the docking connector is electrically connected with the one or more electrical contacts of the object, a second main surface of the object is positioned obliquely relative to the mounting surface in the first position of the docking connector and the second main surface of the object is aligned in contact with the mounting surface in the second position of the docking connector.

15 Claims, 8 Drawing Sheets

(56) References Cited

U.S. PATENT DOCUMENTS

| | | | | |
|---|---|---|---|---|
| 5,964,601 | A * | 10/1999 | Tsurumaru | B60R 11/02 439/341 |
| 5,978,569 | A * | 11/1999 | Traeger | G06F 1/1626 710/64 |
| 6,229,893 | B1 * | 5/2001 | Chen | B60R 11/0241 379/454 |
| 6,762,585 | B2 * | 7/2004 | Liao | H02J 7/0044 320/107 |
| 6,785,567 | B2 * | 8/2004 | Kato | H04B 1/3877 379/433.11 |
| 6,816,713 | B2 * | 11/2004 | Chen | H04M 1/04 455/90.3 |
| 7,480,138 | B2 * | 1/2009 | Kogan | H04M 1/04 361/679.02 |
| 7,756,552 | B2 * | 7/2010 | Haikola | B60R 11/0241 455/575.1 |
| 8,183,825 | B2 * | 5/2012 | Sa | G06F 1/1626 320/112 |
| 8,405,874 | B2 * | 3/2013 | Bostick | H04N 1/60 358/1.9 |
| 8,582,289 | B2 * | 11/2013 | Zhou | H04M 1/04 361/679.41 |
| 8,801,441 | B2 * | 8/2014 | Zhang | H01R 13/633 439/131 |
| 8,842,428 | B2 * | 9/2014 | Zhou | G06F 1/1632 361/679.41 |
| 8,950,717 | B2 * | 2/2015 | Chuang | F16M 13/00 248/316.4 |
| 9,201,453 | B2 * | 12/2015 | Stanley | H04M 1/04 |
| 9,331,444 | B2 | 5/2016 | Carnevali | |
| 9,454,183 | B2 * | 9/2016 | Suckle | G06F 1/1632 |
| 9,706,026 | B2 | 7/2017 | Carnevali | |
| 9,898,041 | B2 | 2/2018 | Blowers et al. | |
| 10,148,104 | B2 * | 12/2018 | Sa | H04M 1/04 |
| 10,209,740 | B2 * | 2/2019 | Vroom | G06F 1/1632 |
| 10,554,002 | B2 * | 2/2020 | Okazaki | H04B 1/3877 |
| 10,965,052 | B2 * | 3/2021 | Shikanai | F16C 41/04 |
| 10,976,777 | B2 * | 4/2021 | Pischel | H04M 1/04 |
| 11,171,449 | B2 * | 11/2021 | Hirose | H01R 13/629 |
| 11,277,506 | B2 * | 3/2022 | Carnevali | H04M 1/06 |
| 2003/0083115 | A1 | 5/2003 | Kato | |
| 2003/0148740 | A1 * | 8/2003 | Yau | H02J 7/0044 455/575.1 |
| 2004/0057199 | A1 * | 3/2004 | Azuchi | G06F 1/1626 361/679.41 |
| 2005/0181756 | A1 * | 8/2005 | Lin | H04H 20/61 455/344 |
| 2013/0016463 | A1 * | 1/2013 | Hiramoto | H01R 35/04 361/679.01 |
| 2013/0273752 | A1 | 10/2013 | Rudisill et al. | |
| 2019/0273350 | A1 | 9/2019 | Okazaki et al. | |

* cited by examiner

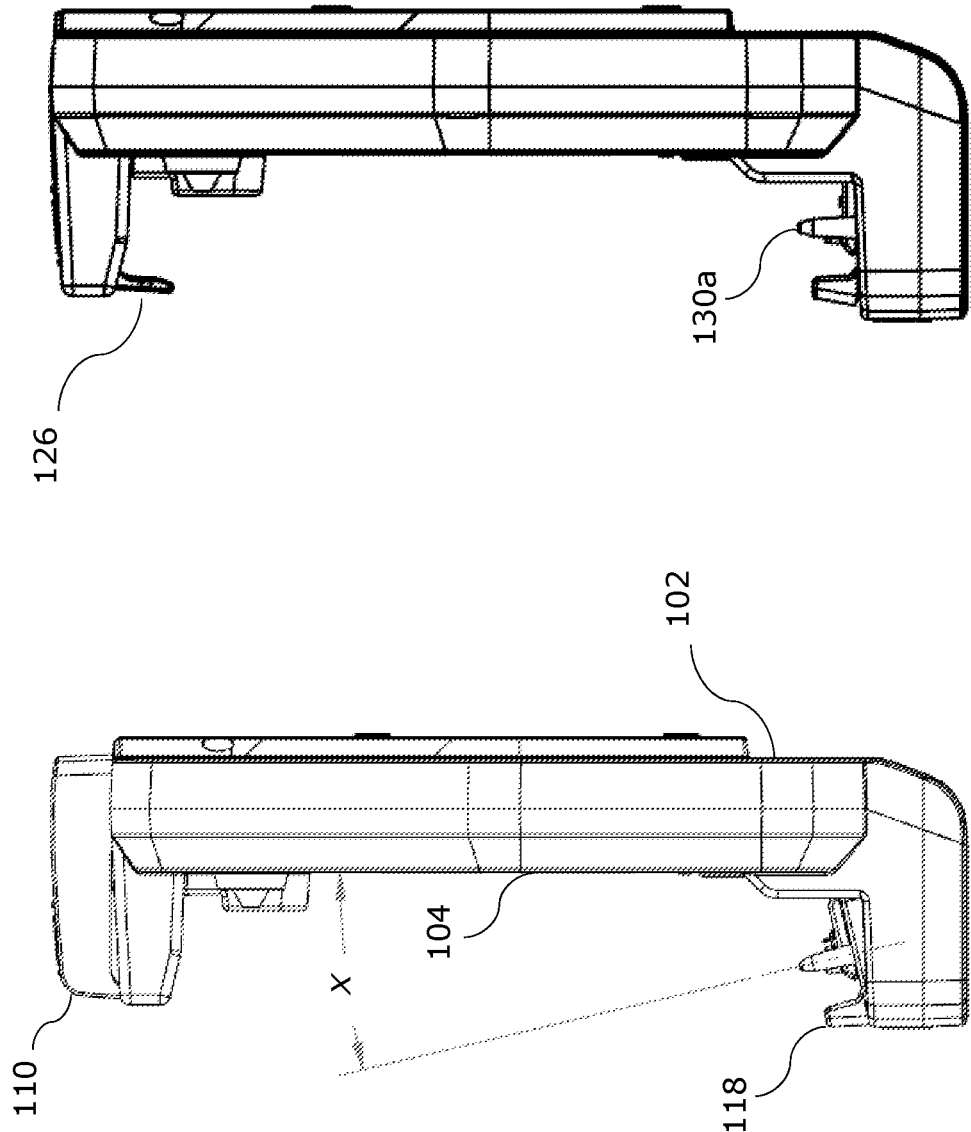

TABLET DOCKING STATION

TECHNICAL FIELD

The present invention relates generally to mounting apparatuses, and more particularly, to apparatuses for securely mounting objects within a moving vehicle.

BACKGROUND

Specialized vehicles are an essential tool in many different professions. For example, professions such as law enforcement commonly utilize a number of specialized electronic apparatuses (e.g., computers, radio systems, sirens) that are not found in conventional automobiles. Other professions and enterprises also commonly have a need to use vehicles with similar specialized equipment. For example, customized electronics apparatuses are frequently installed in vehicles such as forklifts, waste collection trucks, utility trucks, construction equipment and agricultural equipment. While vehicles may be specially manufactured that include these apparatuses, these apparatuses may also be added to conventional automobiles or other vehicles through after-market installations. This is particularly true in the context of law enforcement vehicles, because these vehicles are usually based on conventional road vehicles, and each vehicle can require unique customizations depending upon the particular requirements of the jurisdiction or purpose.

While vehicles are commonly fitted with custom electronics and other equipment, it can be problematic to install such devices in a simple and effective manner. For example, conventional vehicle interior cabins may lack equipment that provides suitable mechanical and/or electrical interfaces for specialized electronic apparatuses. This leads to irregular and relatively inefficient mounting of such devices, as well as inability to maintain specialized electronic apparatuses or equipment in safe and reliable functioning condition.

There remains a need to provide alternative docking stations configured to mount specialized electronic apparatuses or equipment in vehicles, and particularly for retrofitting existing vehicles to include specialized electronic apparatuses or equipment.

SUMMARY

Aspects of the present invention are directed to apparatuses for mounting objects within a vehicle.

In one exemplary aspect, there is provided an apparatus for mounting an object within a vehicle. The object has a first main surface, a second main surface opposite the first main surface, and one or more peripheral side surfaces at least partially surrounding the first main surface. The at least one of the one or more peripheral side surfaces include one or more electrical contacts. The apparatus comprises: a base configured to receive the object, the base comprising a mounting surface and a docking surface projecting from and fixedly coupled to the mounting surface, the mounting surface facing the second main surface of the object when the object is received by the base, the docking surface facing the at least one of the one or more peripheral side surfaces of the object when the object is received by the base; and a docking connector coupled to the docking surface, the docking connector configured to electrically connect with the one or more electrical contacts of the object, the docking connector movable relative to the docking surface between a first position and a second position. When the docking connector is electrically connected with the one or more electrical contacts, the second main surface of the object is positioned obliquely relative to the mounting surface in the first position of the docking connector, and the second main surface of the object is aligned in contact with the mounting surface in the second position of the docking connector.

In some exemplary aspects, the docking connector is mounted on a docking platform, the docking platform being pivotable relative to the docking surface to move the docking connector between the first and second positions.

In some exemplary aspects, the apparatus further comprises one or more biasing elements, the one or more biasing elements biasing the docking platform to move the docking connector from the second position toward the first position.

In some exemplary aspects, the docking platform further includes a stop surface positioned to engage a portion of the mounting surface when the docking connector is in the first position.

In some exemplary aspects, the docking platform is pivotable around a pivot axis, and the one or more biasing elements comprises one or more elastic springs which are unaligned with the pivot axis in order to bias the docking connector toward the first position.

In some exemplary aspects, the docking platform is further translationally movable relative to the docking surface to move the docking connector between the second position and a third position.

In some exemplary aspects, the one or more biasing elements bias the docking platform to move the docking connector from the third position toward the second position.

In some exemplary aspects, the apparatus further comprises at least one blocking surface positioned to prevent disconnection of the object from the docking connector when the docking connector is in the second position, the at least one blocking surface not preventing disconnection of the object from the docking connector when the docking connector is in the first position.

In some exemplary aspects, the at least one blocking surface is fixedly coupled to the mounting surface opposite the docking surface.

In some exemplary aspects, the apparatus further comprises a latch movable between a latched position in which the latch maintains the objected aligned in contact with the mounting surface and an unlatched position in which the latch does not maintain the objected aligned in contact with the mounting surface.

In some exemplary aspects, the latch maintains the objected aligned in contact with the mounting surface by blocking movement of the object in a direction preventing movement of the docking connector from the second position to the first position.

In some exemplary aspects, the latch is configured to contact the second main surface of the object to block the movement of the object.

In some exemplary aspects, the latch further defines the at least one blocking surface.

In some exemplary aspects, the latch is blocked by the object from being moved to the latched position when the object is positioned obliquely relative to the mounting surface in the first position of the docking connector.

In some exemplary aspects, the object is positioned obliquely at an angle of 15° or less relative to the mounting surface in the first position of the docking connector.

In some exemplary aspects, the docking surface comprises one or more pins configured to mate with corresponding recesses of the object to align the object with the docking connector during mounting.

In some exemplary aspects, the docking platform comprises one or more further pins configured to mate with corresponding further recesses of the object to align the object with the docking connector during mounting.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be omitted. In addition, according to common practice, the various features of the drawings are not drawn to scale unless otherwise indicated, and the dimensions of the various features may be expanded or reduced for clarity. Included in the drawings are the following figures:

FIG. 3A is a side view of the apparatus of FIG. 1, showing a first position of an exemplary docking platform.

FIG. 3B is a side view of the apparatus of FIG. 1, showing a second position of the exemplary docking platform.

DETAILED DESCRIPTION

The apparatuses disclosed herein are usable to provide mounting for objects within conventional vehicles (such as automobiles). While the disclosed apparatuses are described herein with respect to mounting within the cabin of a vehicle, it will be understood that the invention is not so limited. To the contrary, aspects of the present invention are usable in any application in which a mount is desired.

While any objects may be mounted to the disclosed exemplary embodiments, the disclosed mounting apparatuses are particularly suitable for mounting electronic devices, such as laptops, tablets, radios, or the like. Other electronic devices or objects mountable with the disclosed apparatuses will be known to those of ordinary skill in the art from the description herein. The mounting apparatuses may be configured to hold the device in a fixed position, or to allow the device to move (e.g., rotate, pivot, etc.) between various positions (e.g., use and stowed positions, driver-side and passenger-side use positions, movement to accommodate user preferences, etc.). In addition, mounting apparatuses may be configured to mount multiple objects or devices simultaneously.

Figure 1:
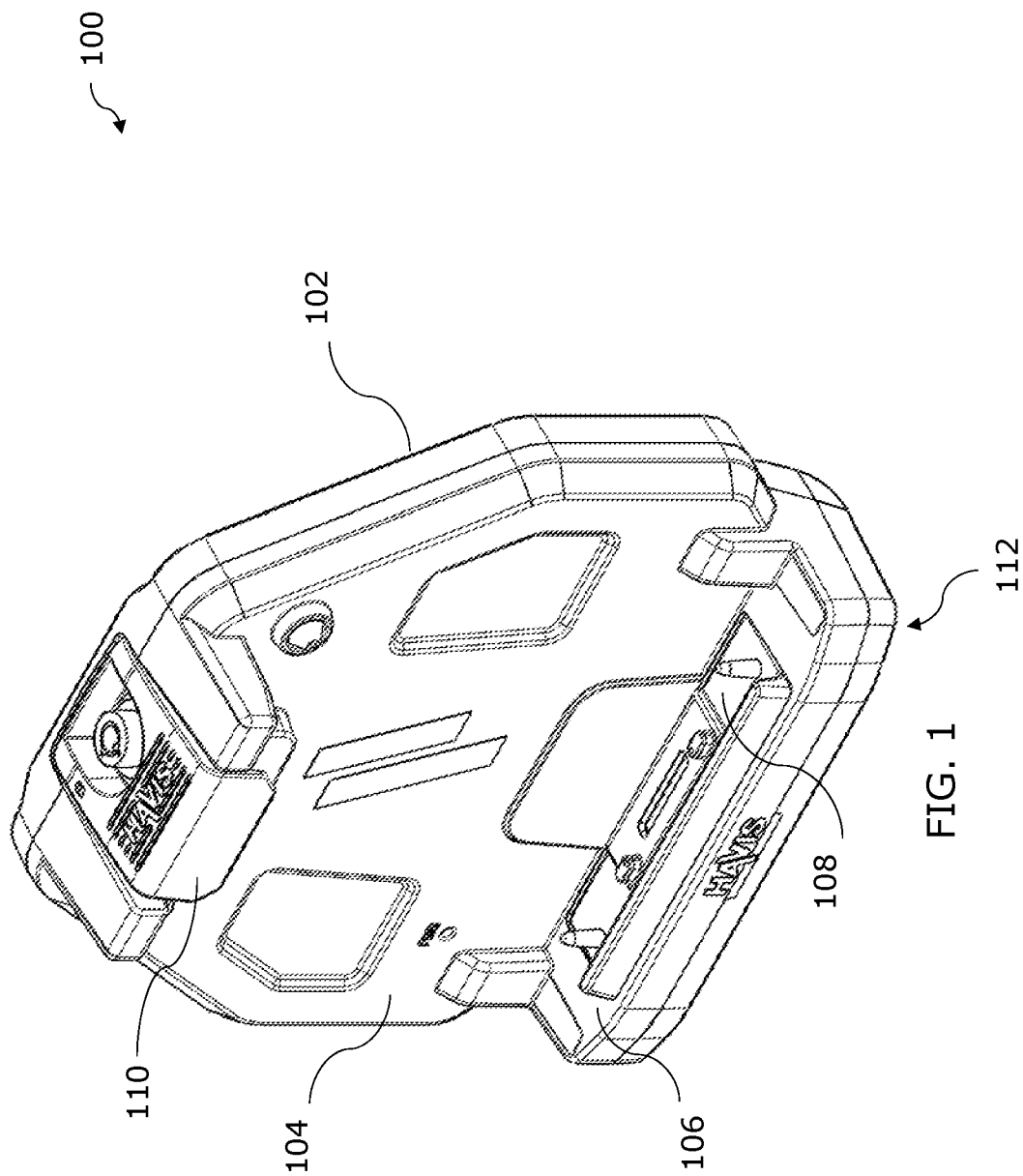
FIG. 1 is a perspective view of an exemplary apparatus for mounting an object within a vehicle.

With reference to the drawings, FIG. 1 illustrates an exemplary apparatus 100 for mounting one or more objects (not shown) within a vehicle cabin. For one example, an object may have a first main surface (e.g., a tablet surface including a touchscreen and/or display), a second main surface opposite the first main surface (e.g., a back surface of the tablet), and one or more peripheral side surfaces at least partially surrounding the first and/or second main surfaces. Further, at least one of the one or more peripheral side surfaces of the object include one or more electrical contacts (e.g., for connecting a charging cord or display cord to the tablet).

An exemplary base 102 of the apparatus 100 is configured to receive the one or more objects. In some examples, the base 102 may be positioned along the fore-aft centerline of a vehicle between the front seating positions, and generally within arm's reach of the driver. The base 102 generally includes a mounting surface 104 and a docking surface 106 that is projecting from and fixedly coupled to the mounting surface 104. When the object is received by the base 102, the mounting surface 104 is positioned to face the second main surface of the object and the docking surface 106 is positioned to face at least one of the one or more peripheral side surfaces of the object. Preferably, the docking surface 106 is positioned to face the at least one of the one or more peripheral side surfaces including one or more electrical contacts, in order to interface with the electrical contacts (as discussed in greater detail below).

The base 102 has sufficient rigidity and strength to securely fix one or more different types of objects or accessories, such as a laptop or tablet computer, computer display screen, radio communication device, and so on. For example, the base 102 may comprise a metal part made of, for example, folded 20 gauge steel, cast aluminum, or the like. The load-bearing capacity of the base 102 preferably is selected to hold the largest compatible object without substantial movement during normal operation of the object and movement of the vehicle. Persons or ordinary skill in the art will understand how to design the base 102 to obtain the desired rigidity and strength based on known engineering principles, which need not be explained in detail herein.

The base 102 may comprise a single unitary part, or it may be an assembly of structural elements comprising multiple individual unitary parts. For example, as shown in FIG. 1, the base 102 may be an assembly of parts including the mounting surface 104, the docking surface 106, a docking platform 108, and a latch 110. The mounting surface 104, the docking surface 106, the docking platform 108, and the latch 110 may be connected to each other using any suitable fasteners or combinations of fastening means, such as screws, nuts and bolts, rivets, welding, adhesives, and so on. The various parts of the base 102 may be formed using any suitable materials. For example, one or more of the parts may comprise sheet metal, cast metal, or machined metals parts. Steel and aluminum are considered to be suitable materials, but other materials, such as carbon fiber reinforce plastics or other composite materials may be used. Unreinforced structural plastics also may be used. Folded sheet metal is preferred for its low cost and high strength, but injection molded plastics, or cast or machined metal parts may be desirable to accommodate particularly complex shape requirements or reduce weight or part count.

The mounting surface 104 may have any suitable size and shape. Preferably, the mounting surface 104 is configured to have a size and shape that generally corresponds to the size and shape of the object to be received. Additionally or optionally, the mounting surface 104 comprises a generally planar surface that extends at a generally orthogonal angle relative to base surface 102, and/or is configured to substantially contact or face the second main surface of the object.

Referring now to FIGS. 1-3B, the docking surface 106 may comprise a single unitary part, or it may be an assembly of structural elements comprising multiple individual unitary parts. For example, as illustrated in FIGS. 2A-2C, the docking surface 106 may comprise the docking platform 108 and a rear cover 112 coupled to the docking platform 108, such that together the docking platform 108 and the rear cover 112 together enclose one or more components therein, with docking platform 108 forming an upper side thereof and rear cover 112 forming an underside thereof. In one example, positioned within the docking platform 108 is a housing 134. As best seen in FIGS. 2B-2C, the rear cover 112 and the housing 134 each may define one or more openings through which screws 138 can be passed through, for example, to couple the rear cover 112, the housing 134, and the docking platform 108.

The housing 134 may further be configured to receive a plate 142. The plate 142 has a size and shape that corresponds to the size and shape of a docking connector 114 having one or more electrical contacts 140. Preferably, the docking connector 114 is mounted on the docking platform 108. The one or more electrical contacts 140 mounted on the docking connector 114 are configured to electrically connect with corresponding electrical contacts of the object. Preferably, the one or more electrical contacts 140 are configured to be connected to the one or more electrical contacts defined by the at least one of the one or more peripheral side surfaces of the object.

Figure 2A:
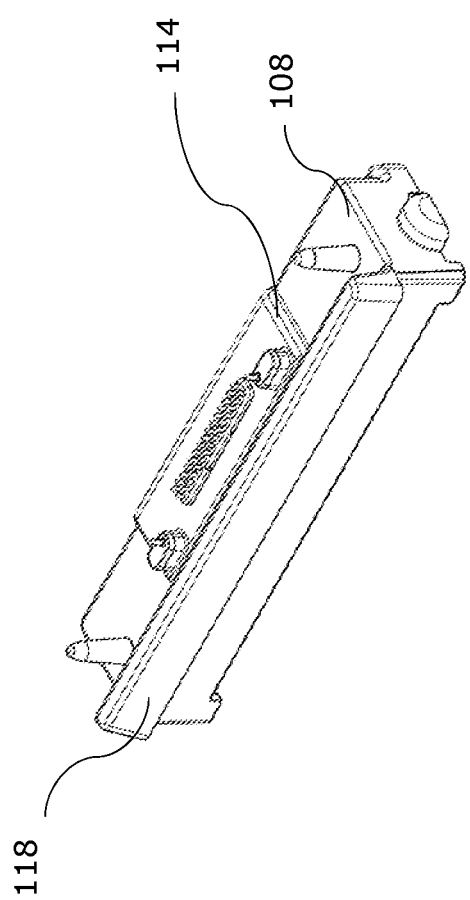
FIG. 2A is a perspective view of an exemplary docking connector coupled to a docking surface of FIG. 1.
Figure 2B:
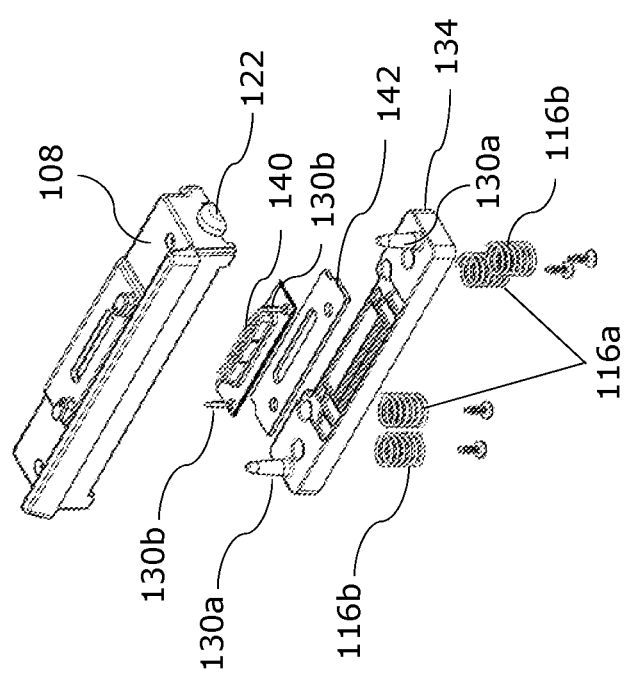
FIGS. 2B-2C depict exploded views of FIG. 2A.

Additionally or optionally, the docking surface 106 further comprises one or more pins 130 configured to mate with corresponding recesses of the object to align the object with the docking connector 114 during mounting. For example, as illustrated in FIG. 2B, the one or more pins may comprise one or more locator pins 130a, that are positioned perpendicular to a pivot axis (further discussed below) to drive a pivot or rotation motion. Specifically, the one or more locator pins 130a are mounted on the housing 134 and extend through corresponding holes defined by the docking platform 108, as illustrated in FIGS. 2A-2B. Moreover, the one or more pins 130 may comprise one or more electrical pins 130b configured to make contact with corresponding electrical contacts of the object. In particular, the one or more electrical pins 130b are configured to mate with corresponding further recesses of the object to align the object with the docking connector 114 during mounting. Specifically, the one or more electrical pins 130b are mounted on the docking connector 114, as illustrated in FIG. 2B. A person of ordinary skill in the art would understand from the description herein that the one or more pins 130 may have any suitable size and shape, such that pins 130 mate with corresponding openings of the object to firmly and reliably guide mating of the object with docking platform 108. In this respect, the size of pins 130 may be precisely controlled with very limited manufacturing tolerances to promote such mating.

Referring now to FIGS. 3A-3B, the docking platform 108 is configured to move the docking connector 114 between a first position and a second position. More specifically, the docking connector 114 is movable relative to the docking surface 106 between the first position and the second position. As seen in FIG. 3A, when the one or more electrical contacts of the object (not shown) are connected to the docking connector 114 and the docking connector 114 is in the first position, or the undocked position, the second main surface of the object is configured to be positioned obliquely relative to the mounting surface 104 (i.e., at an angle X° relative to mounting surface 104). In contrast and as seen in FIG. 3B, when the one or more electrical contacts of the object are connected to the docking connector 114 and the docking connector 114 is in the second position, the second main surface of the object is configured to be aligned in contact with the mounting surface 104 (i.e., at an angle parallel to and/or in contact with mounting surface 104).

Figure 2C:
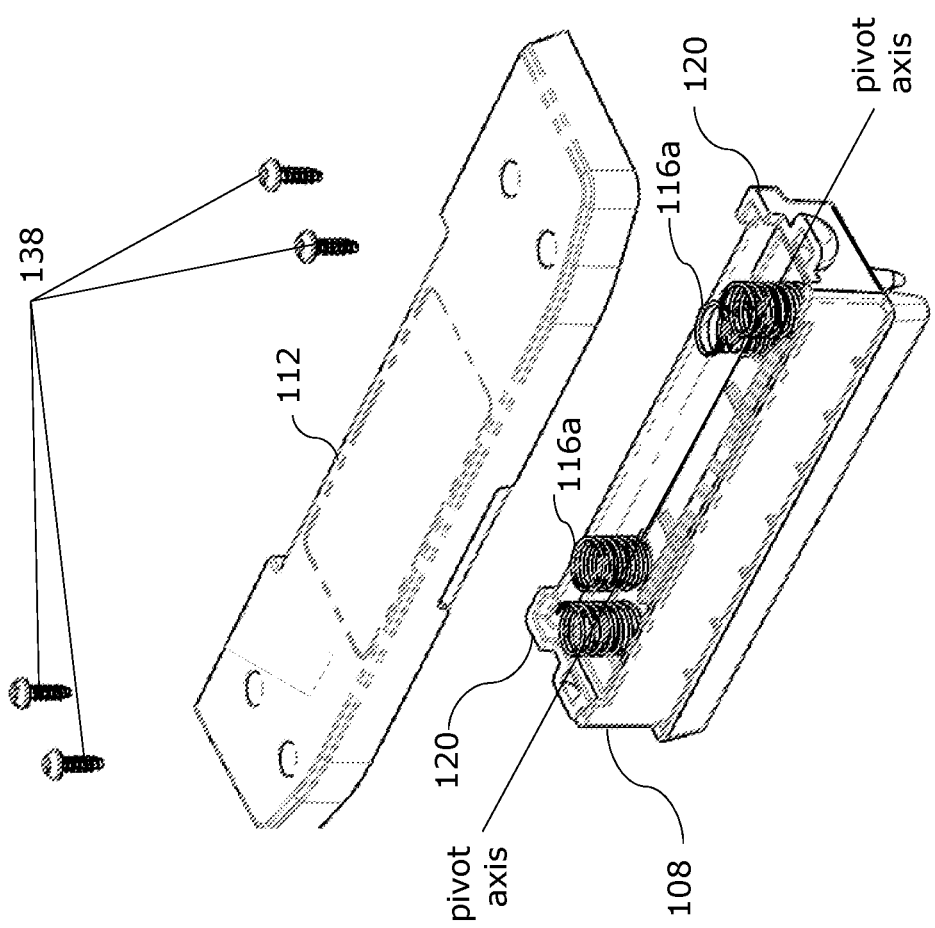

The movement of the docking connector 114, such as movement between the first and second positions, is facilitated by one or more biasing elements. For example, as seen in FIGS. 2B and 2C, the one or more biasing elements, such as rear springs 116a, bias the docking platform 108 to move the docking connector 114 from the second position toward the first position. Further, the docking platform 108 is configured to be pivotable relative to the docking surface 106, such that the docking platform 108 is pivotable around the pivot axis. The pivot axis extends from a first end portion of the docking platform 108 toward a second end portion opposite the first end portion of the docking platform 108, as shown in FIG. 2C. The pivot axis extends through endcaps 122 positioned on the edge of docking platform 108, which guide pivoting movement of docking platform 108.

As illustrated in FIG. 2C, the rear springs 116a are unaligned with the pivot axis in order to bias the docking connector 114 from the second position toward the first position. In this particular example, the rear springs 116a are positioned offset from the pivot axis, such that endcaps 122 of docking platform 108 rotate around the pivot axis, and the docking connector 114 is biased toward the first position, or undocked position. This causes the rear portion of docking platform 108 to rise and pivot forward under bias from rear springs 116a.

Figure 4A:
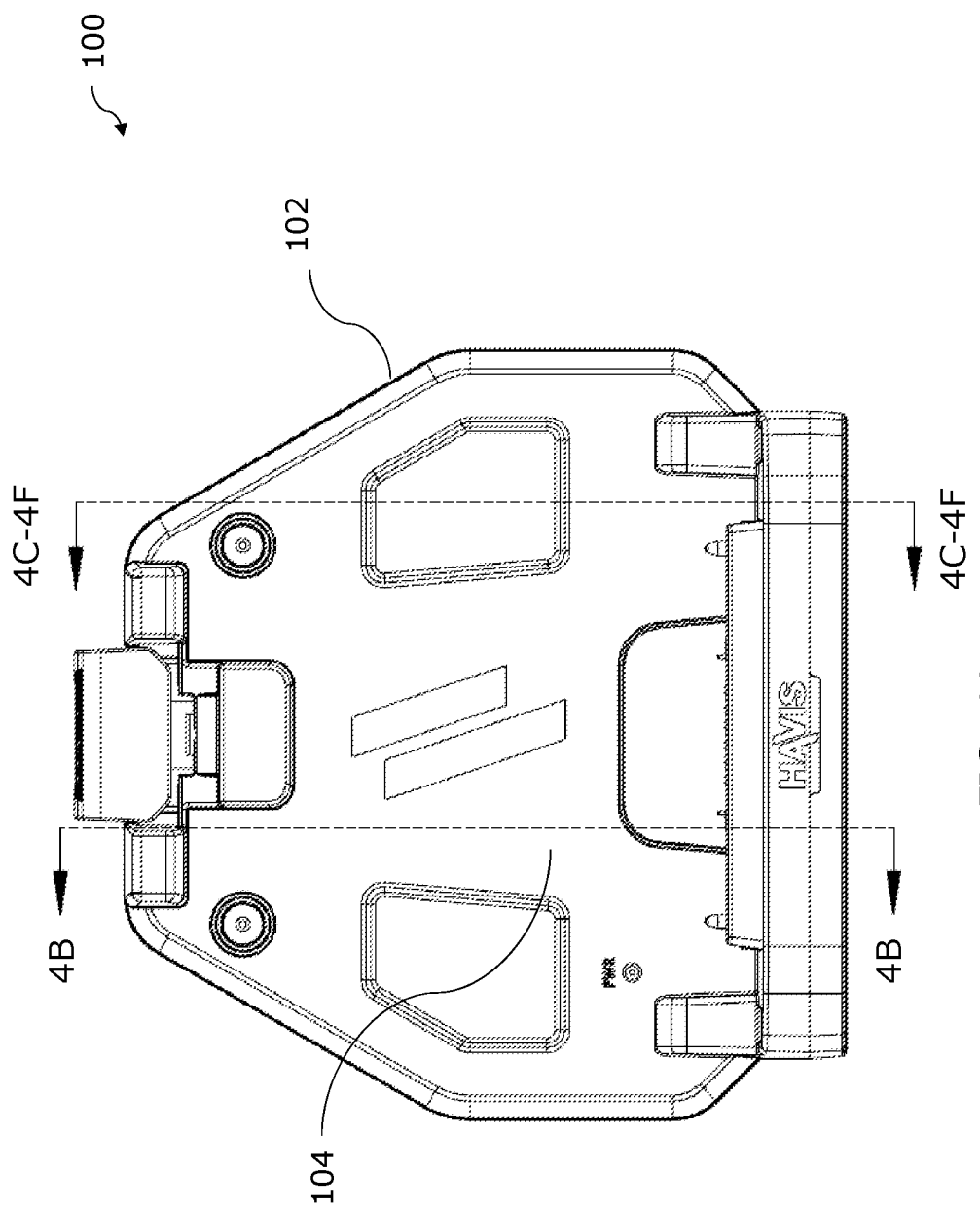
FIG. 4A is a front view of the apparatus of FIG. 1.
Figure 4F:
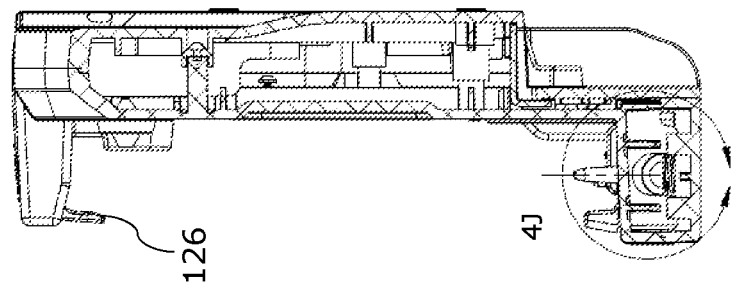
FIGS. 4B-4F show cross-section views of FIG. 4A, showing movement of the docking platform between the first position, the second position, and a third position.
Figure 4E:
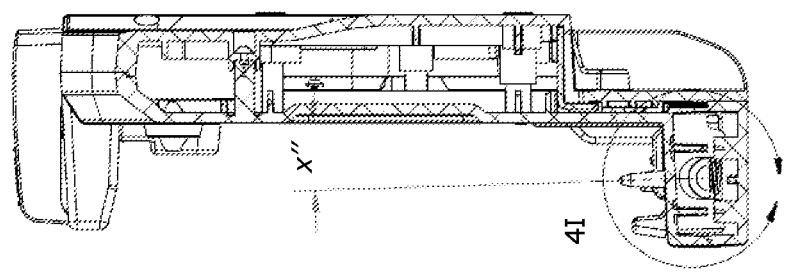
Figure 4D:
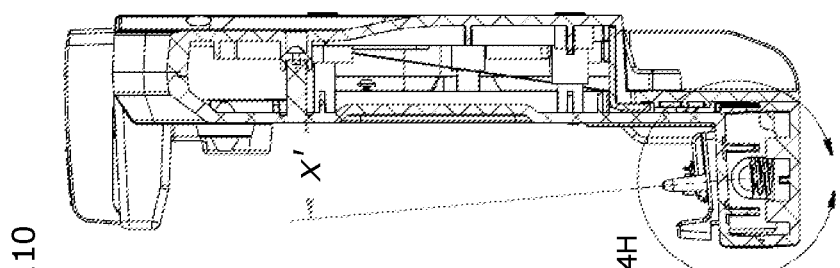
Figure 4C:
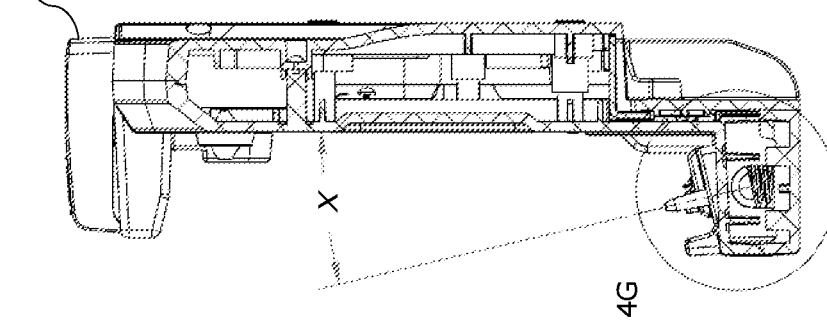
Figure 4B:
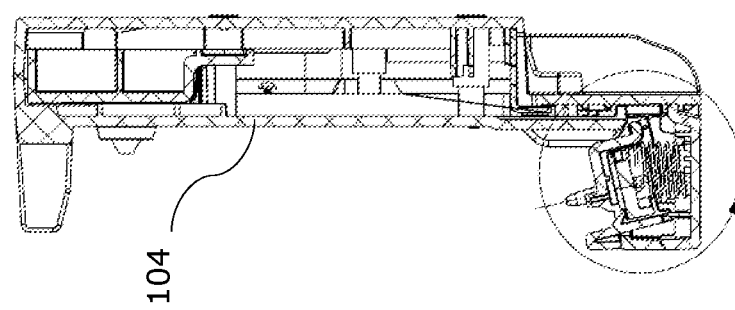
Figures 4G, 4H, 4I, 4J:
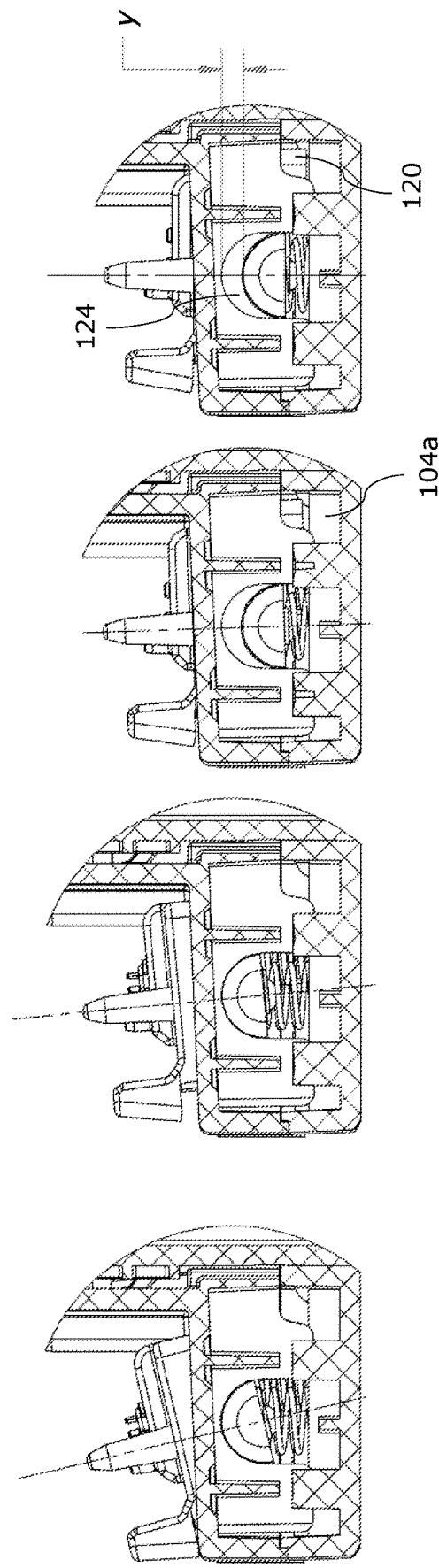
FIGS. 4G-4J show magnified views of a portion of FIGS. 4C-4F, respectively.

The docking platform 108 further includes a stop surface 118 (FIG. 2A) along a front edge thereof, which is positioned to engage a portion of the docking surface 106, as illustrated in FIGS. 4C and 4G, when the docking connector 114 reaches the first position under bias of springs 116a (FIG. 3A). As a non-limiting example, the stop surface 118 is an overhang that has a length corresponding to a length of the docking platform 108 and extends from an exterior surface of the docking platform 108. In this way, the stop surface 118 limits the downward movement (e.g. rotation) of the docking connector 114 when it reaches the first position (FIG. 3A). Additionally or optionally, the docking platform 108 may define rear tabs 120 (FIGS. 2C, 4I, 4J) that limit the movement (e.g. rotation) of the docking connector 114 when it is in the second position (FIG. 3B).

Furthermore, the stop surface 118 may substantially contact the portion of the docking surface 106, such that together the stop surface 118 and the docking surface 106 minimize or inhibit the ingress of unwanted materials (e.g. dust, debris, etc.) into the base 102. Specifically, the stop surface 118 and the docking surface 106 minimize or inhibit the ingress of unwanted materials into the base 102, when the docking connector 114 is in the first or second position (FIGS. 3B, 4E and 4I) or a third position (FIGS. 4F and 4J).

The docking platform 108 may comprise a single unitary part, or it may be an assembly of structural elements comprising multiple individual unitary parts. The multiple individual unitary parts may be connected to each other using any suitable fasteners or combination of fastening means, such as screws, nuts and bolts, rivets, welding, adhesives, and so on. In addition, although FIG. 2A shows stop surface 118 and the docking platform 108 as a single unitary part, a person of ordinary skill in the art would understand that the stop surface 118 may be an individual part that is separate from the docking platform 108.

Referring now to FIGS. 3A-3B and 4A-4J, the docking platform 108 may not only be movable between first and second positions, but may further be translationally movable relative to the docking surface 106 to move the docking connector 114 between the second position (FIGS. 4E and 4I) and a third position (FIGS. 4F and 4J). The movement between the second and third positions can be facilitated by springs 116a, as well as one or more additional biasing elements, such as front springs 116b. Specifically, the front springs 116b bias the docking platform 108 to move from the third position, in which docking platform 108 is recessed within docking surface 106, toward the second position, in which docking platform 108 extends upwardly from docking surface 106.

Thus, in operation, when the one or more electrical contacts of the object (not shown) are connected to the one or more electrical contacts of the docking connector 114, which is mounted on the docking platform 108, and the docking platform 108 is in the first position (FIGS. 3A, 4B, 4C, and 4G), the object is positionable obliquely at an angle, X°, of 15° or less relative to the mounting surface 104. As discussed above, the rear springs 116a bias the docking platform 108 and the docking connector 114 toward the first position, or undocked position.

The docking platform 108 and the docking connector 114 are movable from the first position to the second position. Intermediate positions between the first and second positions are illustrated in FIGS. 4D, 4E, 4H, and 4I. The docking platform 108 moves from the first position to the second position by moving (e.g. pivoting) around the pivot axis. Specifically, an application of force or pressure on the first main surface of the mounted object moves the docking platform 108 against the biasing force of rear springs 116a toward the second position. As the docking platform 108 is moved (e.g. rotated or pivoted) toward the mounting surface 104 and the docking platform 108 moves from the first position to the second position (FIGS. 4B to 4I), the value of angle, X, decreases, until the docking platform 108 is in the second position. When the docking platform 108 is in the second position, the object is positionable to be substantially parallel relative to the mounting surface 104.

As seen in FIGS. 4I and 4J, the docking platform 108 is moved (e.g. rotated or pivoted) toward the mounting surface 104 and toward the second position, until the rear tabs 120 of the docking platform 108 substantially contacts a portion 104a of the mounting surface 104. In this way, the contact between the rear tabs 120 and the portion 104a limits the movement (e.g. rotation) of the docking platform 108 as it moves toward the second position. Additionally, endcaps 122 of docking platform 108 guide the rotary pivoting movement of the docking platform 108 between the first and second positions. In particular, the endcaps 122 are configured to move, e.g. rotate, around the pivot axis and this movement is guided by corresponding mating slots 124 (FIG. 4J) defined by the docking surface 106.

As illustrated in FIGS. 4F and 4J, the docking platform 108 moves toward the third position when the docking platform 108 translationally moves a distance, y, (FIG. 4J). In a non-limiting example, the cylindrical endcaps 122 allow the docking platform 108 and the docking connector 114 mounted thereon to move between the second and third positions. When the docking platform 108 is translationally moved the distance, y, from the second position to the third position, the cylindrical endcaps 122 are substantially separated or disengaged from the corresponding mating slots 124. The movement between the second and third positions is facilitated by the front springs 116b. In particular, the front springs 116b bias the docking platform 108 against a downward movement from the second position toward the third position. The docking platform 108 thus moves from the second position to the third position by translationally moving the distance, y, such that the docking platform 108 moves against the biasing spring operation and toward the third position. Movement of the docking platform 108 toward the third position allows the mounted object to be secured by the at least one of a blocking surface 126 and latch 110 (as discussed below).

Turning now to FIGS. 3A-3B, the base 102 may further comprise the at least one blocking surface 126. As seen in FIG. 3B, the at least one blocking surface 126 is positioned to prevent disconnection of the object from the docking connector 114 when the docking connector 114 is in the second position. Specifically, the at least one blocking surface 126 is fixedly coupled to the mounting surface 104 and is positioned opposite the docking surface 106. In contrast and as illustrated in FIG. 3A, the at least one blocking surface 126 is positioned to permit, or not prevent, disconnection of the object from the docking connector 114 when the docking platform 108 is in the first position.

The base 102 may further comprise a latch 110 that is movable between a latched position and an unlatched position. As seen in FIG. 3B, in the latched position, the latch 110 maintains the object (not shown) aligned in contact with the mounting surface 104. Specifically, the latch 110 maintains the object aligned in contact with the mounting surface 104 by blocking movement of the object. The latch 110 is adapted to block the object's movement in a direction that would prevent the docking connector 114 from moving toward the first position (undocked position) from the second position. The latch 110 may be configured to contact at least a portion of the first main surface or the at least one of the one or more peripheral side surfaces of the object to block movement of the object. In a non-limiting example, the latch 110 is configured to define the at least one blocking surface 126, such that the at least one blocking surface 126 is repositionable to prevent or allow disconnection of the object from the docking connector 114 depending on whether the latch 110 is in a latched or unlatched position.

As seen in FIG. 3A, in the unlatched position, blocking surface 126 has been moved upward away from docking surface 106, and as a result, the latch 110 does not maintain the object aligned in contact with the mounting surface 104. Particularly, the latch 110 does not maintain the object aligned in contact with the mounting surface 104 by not blocking pivoting movement of the object. The latch 110 permits the object's movement in a direction that would not prevent the docking connector 114 from pivoting toward the first position from the second position. More particularly, the latch 110 is configured to disengage or not make contact with at least the portion of the first main surface or the at least one of the one or more peripheral side surfaces of the object. In a non-limiting example, the latch 110 is configured to define the at least one blocking surface 126, such that the at least one blocking surface 126 is positionable to permit disconnection of the object from the docking connector 114 when the latch 110 is in the unlatched position. Still further, the latch 110 may be blocked by the object from movement toward the latched position when the object is positioned obliquely relative to the mounting surface 104. The object may be positioned obliquely relative to the mounting surface 104 when the docking connector 114 is in the first position.

Although FIGS. 3A and 3B show the at least one blocking surface 126 and the latch 110 as a single unitary part, a person of ordinary skill in the art would understand that the blocking surface 126 may be an individual part that is separate from the latch 110. Other alternatives and variations will be apparent to persons of ordinary skill in the art in view of the present disclosure.

In operation, the latch 110 is configured to be translationally movable relative to the object for moving the blocking surface 126 a distance. The latch 110 is translationally movable relative to the object, such that the at least one blocking surface 126 is positionable to engage or make contact with a portion of the first main surface, thereby preventing disconnection of the object from the docking connector 114 when the latch 110 is in the latched position (FIG. 3B). Additionally or optionally, the at least one blocking surface 126 is positionable to engage or make contact with a portion of the at least one of the one or more peripheral side surfaces of the object, thereby preventing disconnection of the object from the docking connector 114 when the latch 110 is in the latched position (FIG. 3B).

When in the latch 110 is in the latched position, and is translationally moved toward docking surface 106, latch 110 may further apply force to the peripheral surface of the object, in order to move the object against the biasing force of springs 116a and/or 116b, to move the object from the second position toward the third position. Latch 110 may hold the object and docking platform 108 in the third position when latch 110 is in the latched position. This operation may promote a secure and reliable connection of electrical contacts of the object with electrical contacts of docking connector 140, e.g., due to the biasing force of springs 116a and 116b on the bottom side of the object pressing the mounted object against latch 110.

Conversely, the latch 110 is also configured to be translationally moveable relative to the object, such that the at least one blocking surface 126 is positionable to disengage or not make contact with the portion of the second main surface of the object, thereby permitting disconnection of the object from the docking connector 114 when the latch 110 is in the unlatched position (FIG. 3A). Additionally or optionally, the at least one blocking surface 126 is positionable to disengage or not make contact with the portion of the at least one of the one or more peripheral side surfaces of the object, thereby permitting disconnection of the object from the docking connector 114 when the latch 110 is in the unlatched position (FIG. 3B).

As a non-limiting example, the latch 110 may include a releasable actuator, such as a button or the like, that is configured to move the latch between the unlatched and latched positions. In particular, by pushing or actuating the releasable actuator of the latch 110, the latch 110 translationally moves relative to the object, such that the at least one blocking surface 126 is positionable to engage or make contact with the object, thereby preventing disconnection of the object from the docking connector 114 when the latch 110 is in the latched position. Latch 110 may further include a lock or other access control device to prevent release of a mounted object to unauthorized users. Suitable locks and/or access control devices for use in controlling the release of latch 110 will be understood to those of ordinary skill in the art.

Although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. An apparatus for mounting an object within a vehicle, the object having a first main surface, a second main surface opposite the first main surface, and one or more peripheral side surfaces at least partially surrounding the first main surface, at least one of the one or more peripheral side surfaces including one or more electrical contacts, the apparatus comprising:
    a base configured to receive the object, the base comprising a mounting surface and a docking surface projecting from and fixedly coupled to the mounting surface, the mounting surface facing the second main surface of the object when the object is received by the base, the docking surface facing the at least one of the one or more peripheral side surfaces of the object when the object is received by the base;
    a docking connector coupled to the docking surface, the docking connector configured to electrically connect with the one or more electrical contacts of the object, the docking connector movable relative to the docking surface between a first position and a second position, wherein when the docking connector is electrically connected with the one or more electrical contacts, the second main surface of the object is positioned obliquely relative to the mounting surface in the first position of the docking connector, and the second main surface of the object is aligned in contact with the mounting surface in the second position of the docking connector,
    wherein the docking surface comprises one or more pins configured to mate with corresponding recesses of the object to align the object with the docking connector during mounting, and
    wherein the docking platform comprises one or more further pins configured to mate with corresponding further recesses of the object to align the object with the docking connector during mounting.

2. The apparatus of claim 1, wherein the docking connector is mounted on a docking platform, the docking platform being pivotable relative to the docking surface to move the docking connector between the first and second positions.

3. The apparatus of claim 2, further comprising one or more biasing elements, the one or more biasing elements biasing the docking platform to move the docking connector from the second position toward the first position.

4. The apparatus of claim 3, wherein the docking platform further includes a stop surface positioned to engage a portion of the docking surface when the docking connector is in the first position.

5. The apparatus of claim 3, wherein the docking platform is pivotable around a pivot axis, and the one or more biasing elements comprises one or more elastic springs which are unaligned with the pivot axis in order to bias the docking connector toward the first position.

6. The apparatus of claim 3, wherein the docking platform is further translationally movable relative to the docking surface to move the docking connector between the second position and a third position.

7. The apparatus of claim 6, wherein the one or more biasing elements bias the docking platform to move the docking connector from the third position toward the second position.

8. The apparatus of claim 1, further comprising at least one blocking surface positioned to prevent disconnection of the object from the docking connector when the docking connector is in the second position, the at least one blocking surface not preventing disconnection of the object from the docking connector when the docking connector is in the first position.

9. The apparatus of claim 8, wherein the at least one blocking surface is fixedly coupled to the mounting surface opposite the docking surface.

10. The apparatus of claim 9, further comprising a latch movable between a latched position in which the latch maintains the object aligned in contact with the mounting surface and an unlatched position in which the latch does not maintain the object aligned in contact with the mounting surface.

11. The apparatus of claim 10, wherein the latch maintains the object aligned in contact with the mounting surface by blocking movement of the object in a direction preventing movement of the docking connector from the second position to the first position.

12. The apparatus of claim 11, wherein the latch is configured to contact the second main surface of the object to block the movement of the object.

13. The apparatus of claim 12, wherein the latch further defines the at least one blocking surface.

14. The apparatus of claim 13, wherein the latch is blocked by the object from being moved to the latched position when the object is positioned obliquely relative to the mounting surface in the first position of the docking connector.

15. The apparatus of claim 1, wherein the object is positioned obliquely at an angle of 15° or less relative to the mounting surface in the first position of the docking connector.

\* \* \* \* \*